United States Patent [19]

Hoback et al.

[11] Patent Number: 5,083,002

[45] Date of Patent: Jan. 21, 1992

[54] SHIELDING GAS MIXTURE FOR WELDING SUPERALLOYS

[75] Inventors: Gregory L. Hoback, Greentown; James L. Meyers, Kokomo, both of Ind.

[73] Assignee: Haynes International, Inc., Kokomo, Ind.

[21] Appl. No.: 639,434

[22] Filed: Jan. 10, 1991

[51] Int. Cl.⁵ .............................................. B23K 9/16
[52] U.S. Cl. ................................... 219/74; 219/137 R
[58] Field of Search ....................... 219/74, 75, 137 R

[56] References Cited

U.S. PATENT DOCUMENTS

| | | | |
|---|---|---|---|
| 2,591,926 | 4/1952 | Gibson et al. | 219/10 |
| 2,753,427 | 7/1956 | Yenni et al. | 219/10 |
| 3,042,484 | 7/1962 | Maring | 23/14 |
| 3,139,506 | 6/1964 | Wolff et al. | 219/74 |
| 3,469,304 | 9/1969 | Medsker | 29/494 |
| 3,470,346 | 9/1969 | Duboz | 219/74 |
| 3,496,323 | 2/1970 | Lesnewich et al. | 219/74 |
| 4,463,243 | 7/1984 | Church | 219/74 |
| 4,749,841 | 7/1988 | Galantino et al. | 219/137 |
| 4,857,692 | 8/1989 | Larson et al. | 219/74 |
| 4,871,898 | 10/1989 | Cherne et al. | 219/137 |
| 4,973,822 | 11/1990 | Evans et al. | 219/74 |
| 4,999,474 | 3/1991 | Schultz et al. | 219/74 |

*Primary Examiner*—Clifford C. Shaw
*Attorney, Agent, or Firm*—R. Steven Linne

[57] ABSTRACT

This invention discloses a novel shielding gas mixture for use in gas shielded arc welding processes. The shielding gas of this invention may be used in a wide variety of processes when welding various superalloy compositions. In the broad range, the composition contains, in percent by volume, 5 to 12 helium, 0.1 to 0.9 carbon dioxide and the balance argon. The typical composition contains about 10 helium, about 0.25 to 0.55 carbon dioxide and the balance argon plus impurities.

6 Claims, No Drawings

SHIELDING GAS MIXTURE FOR WELDING SUPERALLOYS

FIELD OF THE INVENTION

This invention relates generally to the electric arc welding of special metals, such as nickel-based and cobalt-based superalloys, by processes, for example, gas metal arc welding (GMAW), requiring a shielding gas to protect the weld from the atmosphere. It more specifically relates to improvements in gas metal arc welding processes including the use of a shielding gas mixture containing helium and carbon dioxide in an argon base.

BACKGROUND AND PRIOR ART

During welding, contamination and/or oxidation of the molten, solidifying and cooling metal by the atmosphere must usually be avoided. In some types of welding processes, this is accomplished by the use of fluxes and/or slags, while in other welding processes this is accomplished by welding in a vacuum. Another very common method of protecting the hot and reactive weld metal is to surround it with inert shielding gases until it cools. Welding processes which use such inert gas protection are generally well known in the art and include, but are not limited to, gas metal arc welding (GMAW), gas tungsten arc welding (GTAW) and plasma arc welding (PAW).

In general, because of its relatively low cost and extreme inertness, argon is often used with these gas shielded welding processes as the principal shielding gas. This is particularly true with the gas tungsten arc welding process, where 100% argon is nearly always recommended. While the gas composition has only minor effects when gas tungsten arc welding many common metals, the number of welding transfer modes possible with the gas metal arc welding process have necessitated a wide range of mixtures of shielding gases to accommodate and optimize the various modes of metal transfer.

While generally these inert shielding gases are primarily designed to exclude atmospheric oxygen from the weld zone, small controlled amounts of active (oxidizing) gases, such as carbon dioxide and/or oxygen, are often added. When these active gases are blended with inert shielding gases, usually argon and/or helium, unique conditions are known to be produced during gas metal arc welding.

A variety of known GMAW shielding gases, some of which contain controlled amounts of oxygen and/or carbon dioxide, are discussed below. Many of these gases have received U.S. patent coverage as noted. Generally, in reviewing the literature concerning these GMAW shielding gas mixtures, a specific weld metal transfer mode is discussed or recommended. That is, the gas mixture has been blended to optimize welding in one specific GMAW transfer mode. As apparent from even a cursory review of the prior art and the patents, there are contradictory opinions relating to the proportions of carbon dioxide, helium and argon in shielding gas mixtures.

U.S. Pat. No. 2,591,926 discloses an argon-base gas containing about 20 to 60% (preferably 40-50%) helium suitable for short-arc welding of aluminum, stainless steels, or nickel alloys.

U.S. Pat. No. 2,753,427 discloses welding gases containing a range of 40 to 80% helium, 3 to 10% carbon dioxide and balance argon. The composition preferably contains 10 to 57% argon, 40 to 70% helium and 3 to 5% carbon dioxide.

U.S. Pat. No. 3,042,484 discloses a gas containing 1 to 30% argon in a carbon dioxide base suitable for protecting molten metal from oxidation.

U.S. Pat. No. 3,139,506 discloses a gas containing 20-70% $CO_2$, 1-15% $O_2$ in an argon or helium base.

U.S. Pat. No. 4,463,243 discloses shielding gas compositions containing 25 to 60% helium, 3 to 10% carbon dioxide, 40 to 70% argon and 0.1 to 1% oxygen. The invention evidently resides in a shielding gas with "uniquely proportioned four-gas mixture" that provides unexpected improvements.

U.S. Pat. No. 4,749,841 discloses a range of 16 to 25% helium, 1 to 4% carbon dioxide and 71 to 83% argon. The composition preferably contains about 20% helium and about 3% carbon dioxide and specifically teaches against less than 1% carbon dioxide. The proportions of gases are blended within a narrow range thereby providing a "sufficiently precise control of the minor constituents" to avoid the harmful effects of carbon dioxide contents below about 1%.

U.S. Pat. No. 4,857,692 discloses a shielding gas for use in spray mode gas metal arc welding. This shielding gas contains 3 to 8% carbon dioxide, 30 to 40% argon and balance helium. The only specific example of a shielding gas composition contained 61% helium, 35% argon and 4% carbon dioxide.

U.S. Pat. No. 4,871,898 discloses a constant arc voltage, gas metal arc welding process. The shielding gas mixture (sold commercially under the trademark HELISTAR by Union Carbide Corporation) contains 2 to 12% and preferably 8 to 12% carbon dioxide, 20 to 45% helium and the balance argon. The only specific example of a shielding gas contained 8% carbon dioxide. HELISTAR gas is reported to be useful for spray and pulse-spray arc welding of carbon and low-alloy steels. HELISTAR SS gas is similar (30% He, 1% $CO_2$ in argon) and is reported to be useful for stainless steels.

Other commercially available shielding gases include: Grade A-1025 which is a shielding gas containing argon and carbon dioxide in a helium base and is specifically blended and recommended for GMAW short circuit transfer mode welding with stainless steel.

Grades 99-1 and 98-2 are argon based shielding gases, containing 1% or 2% oxygen, respectively, which are routinely recommended for spray transfer welding of stainless steel.

In each of the above references, it appears that the shielding gas is designed to perform in some specific transfer mode of gas metal arc welding and often takes into account some specific alloy system to be joined.

It is also known in the art that the melting and welding of the Nickel-based and Cobalt-based Alloys requires special care.

For many years, argon and/or argon-helium mixtures have been recommended and used as shielding gases for welding the superalloys, for example the nickel-based HAYNES ® and HASTELLOY ® alloys. A shielding gas containing 75% argon and 25% helium (identified herein as "75-25" and apparently first disclosed in U.S. Pat. No. 2,591,926) has routinely been recommended during short circuit transfer mode welding while 100% argon has been recommended routinely for spray transfer mode gas metal arc welding. HAYNES and HASTELLOY are registered trademarks of Haynes International, Inc.

When using the 75-25 shielding gas in the short circuit mode, bright-shiny welds are produced. In addition, excellent cleaning action is noted along the edge of the arc. As a result, only minimal wire brushing is required between weld passes. However, with this shielding gas, the arc is erratic and unstable which leads to excessive spatter and poor bead appearance. In addition, during dissimilar welding between carbon steel and nickel-based alloys, such as HASTELLOY C-22 alloy, the arc is highly unstable, does not strike off easily and produces excessive spatter.

The solution to this problem, in the short circuit mode, is to use a shielding which contains carbon dioxide. One common gas which has been used with the nickel-based alloys is grade A-1025. This gas contains 2.5% carbon dioxide with small amounts of argon (about 7½%) in a helium base. This gas will produce an exceptionally stable arc, with little or no weld spatter. In addition, during dissimilar welding, the arc will strike-off immediately producing a very stable arc. The drawback to this gas, when welding with nickel-based alloys, is the formation of a very heavy black oxide scale on the weld metal surface. Such an oxidized surface requires considerable interpass grinding and/or heavy wire brushing when making multipass welds. Because the molten metal surface is highly oxidized, welding travel speeds must be low, so as to allow enough time for the weld metal to flow outwardly and tie into the adjacent base material.

As a result of this oxidized condition, considerable economic penalty must be paid for lower production rates and higher labor costs. A second economic penalty must usually be paid as a result of the higher cost of a helium rich shielding gas.

A somewhat similar situation exists during spray transfer welding of the nickel-based alloys. With the use of 100% argon shielding gas, the arc tends to be unstable with considerable tendency for "arc-wander". The addition of helium is not known to improve arc stability under this mode of weld metal transfer. With such a situation, the welding operator has limited control of the process and less than optimum welds are often produced.

The addition of 1% or 2% oxygen to the argon shielding gas will greatly improve arc stability and reduce "arc-wander". Such a gas, as with the carbon dioxide bearing gases, produces an oxidized weld metal surface, which requires additional grinding between weld passes. Again, this improvement in welding characteristics results in an economic penalty due to the higher labor costs of interpass grinding.

Recent improvements in gas metal arc welding shielding gases suggest that a single gas can be used with several GMAW metal transfer modes when welding stainless steel. A typical example is HELISTAR SS gas which is reported to contain about 1% carbon dioxide, about 30% helium and balance argon. However, as with the other oxygen or carbon dioxide bearing shielding gases, surface oxidation of weld metal is severe with the nickel-based alloys, making interpass grinding an economic consideration.

SUMMARY OF THE INVENTION

In view of the foregoing, it should be apparent that there is an unmet need in the art for improvements in the welding of superalloys.

It is therefore a principal object of this invention to provide a novel shielding gas that may be used with a variety of weld metal transfer modes for the gas metal arc welding of various superalloys. This would include the joining of fabricated components as well as the weld-overlaying (hard facing) of high alloy materials onto substrates for corrosion and wear protection.

It is another object of this invention to provide a lower cost and/or higher quality process for the welding of superalloys.

These objects may be fulfilled by providing an argon-based shielding gas during arc welding which contains a moderate amount of helium, preferably 5 to 13% or more preferably 8–12%, and a small amount of carbon dioxide, preferably 0.1 to 0.9% or more preferably 0.25 to 0.75%.

Other objects and advantages should become apparent to those skilled in the art from the following detailed description and examples.

DETAILED DESCRIPTIONS OF THE INVENTION AND EXAMPLES

Shielding gases often affect the gas metal arc welding process in subtle ways which are not easily quantified. Therefore, most of the results reported herein are observations dealing with bead appearance, arc stability and other subjective opinions of an experienced welding operator. Generally, significant differences in mechanical and/or corrosion properties have not been observed when various grades of shielding gas are used.

Initial work concerning this shielding gas began in response to problems when gas metal arc welding a nickel-based superalloy, HAYNES 242 alloy. As described above, common 75% argon-25% helium shielding gas produced very poor arc characteristics, making welding of this alloy difficult. When commercially available grade A-1025 was tried as an alternative shielding gas, the weld metal became very sluggish and it was difficult to make an acceptable weld.

Experiments toward development of a novel mixture of gases for welding of this nickel-based alloy began by blending various percentages of argon to grade A-1025 shielding gas. Such blending was accomplished using a proportional gas mixer (Smith's Proportional Gas Mixer, model 299-006-3). This mixer is designed and calibrated to blend argon-helium shielding gas mixtures.

While the grade A-1025 gas is not pure helium, at 90% helium it was felt that a good approximation of final gas composition could be obtained by proportional flow calculations. Initial trials were conducted where the percentage of argon was varied, since diluting the known grade A-1025 helium based gas with a known amount of argon allowed accurate testing of low concentrations of $CO_2$.

Four initial trials were conducted in which about 50%, 70%, 80% and 90% pure argon was proportionally blended with grade A-1025 shielding gas. Pure argon gas was supplied to the argon inlet and grade A-1025 shielding gas was supplied to the helium inlet of the proportional mixer. The approximate final compositions of those four blends are indicated below in volume percent.

Trial 1 = 53.75% AR, 45% He, 1.25% $CO_2$.
Trial 2 = 72.25% AR, 27% He, 0.75% $CO_2$.
Trial 3 = 81.50% AR, 18% He, 0.50% $CO_2$.
Trial 4 = 90.75% AR, 9% He, 0.25% $CO_2$.

Based upon these tests, it became clear that decreasing the already low quantity of carbon dioxide definitely improved the bead appearance by reducing the degree of oxidization of the weld metal. Interestingly, during short circuit transfer operation, the weldability did not significantly suffer as the gas composition moved well away from the composition of the A-1025 mixture. This work clearly indicated that very low quantities of carbon dioxide are beneficial in terms of reducing weld metal oxidation and are not detrimental in terms of short circuit transfer gas metal arc welding operability.

A second set of experiments was conducted using two certified custom mixtures of argon-helium-carbon dioxide shielding gases. Those compositions are hereinafter called Mix A and B. In these experiments, the quantities of carbon dioxide (0.55 and 0.25 respectively) were similar to the carbon dioxide levels noted in Trials 3 and 4, however helium content in these experiments was held constant at approximately 10% (10.5 and 10.74 respectively). Again as in the earlier experiments, the quantity of carbon dioxide had an influence on the degree of oxidation of the weld metal. However, the general operability of these mixed gases did not change when compared to Trials 3 and 4. The major difference in those blended gases was the percentage of helium present due to dilution effects.

Based upon this second set of experiments it was again concluded that carbon dioxide content has a clear influence on weldability and on weld metal oxidation. Further, it was concluded that the quantity of helium, shows little or no improvement in welding characteristics when above about 10% by volume.

During subsequent work on a variety of nickel-based and cobalt-based alloys, and on work with dissimilar welds between carbon steel and stainless steel to various nickel-based alloys, similar results have been noted to those of the initial welding studies using HAYNES 242 alloy welding product. Specific tests have been run with HAYNES 230 alloy (nominally 22% Cr, 14% W, 2% Mo, balance Ni), HASTELLOY C-22 alloy (nominally 22% Cr, 3% W, 13% Mo, 3% Fe, balance Ni), HAYNES 214 alloy (nominally 16% Cr, 3% Fe, 4.5% Al, balance Ni) and ULTIMET TM alloy (nominally 26% Cr, 3% Fe, 5% Mo, 2% W, 9% Ni, balance CO). In each case, excellent welding characteristics were noted in a variety of weld metal transfer modes.

In one set of welding trials using ULTIMET alloy, welds were made in the spray transfer mode and short circuit transfer mode using shielding gas Mix B. It was significant to note that while in spray transfer mode the arc was very stable with no tendency for "arc-wander". Excellent cleaning action was noted along the edge of the weld. Only hand wire brushing was necessary prior to welding the next pass. In the short circuit mode, a stable arc was maintained with no spatter noted. The weld bead was clean with a uniform regular rippled appearance. Only hand wire brushing was required between passes. Mechanical properties, as measured by longitudinal bend ductility testing, was considered fully acceptable.

In a second set of tests joining thin sheets (0.062") of UNS alloy No. N06022 (specifically C-22 alloy), welding was conducted using a pulse-spray (synergic welding power supply) transfer mode and gas Mix B. In these tests, excellent weldability was noted. Welds were made in the flat and overhead position. In each case, bright shiny welds were noted with need for only hand wire brush cleaning. Bead appearance was much improved over the traditional gas used for this application (grade A-1025). In this test series, gas Mix B was found to be superior to 75-25 and HELISTAR SS gases, in terms of weldability and weld cleanliness.

This current invention also relates to a welding process using a shielding gas mixture containing carbon dioxide and helium in an argon base. Further use of this gas mixture leads to important process improvements particularly when welding certain nickel-based and cobalt-based alloys.

For example, an economical method of protecting large vessels or ducts from corrosion is to cover the exposed surfaces of inexpensive structural steel with thin sheets of highly corrosion resistant, nickel-base materials. Such a process, similar to wallpapering, typically involves extensive welding of each sheet both for attachment to the structural steel and to seal adjacent sheets along each overlapping edge. The welding must be of high quality and leak tight to prevent corrosive failure in the weld area.

This wallpapering process may advantageously use the shielding gas of the present invention when welding thin sheets of UNS alloy No. N06022 over carbon steel substances in large ducts exposed to corrosive gases, for example, in power plant flue gas desulfurization systems.

Basically, the process includes the steps of: (a) preparing or cleaning the substrate and alloy sheets at least in the area to be joined, (b) structurally attaching the alloy sheets to the substrate by intermittent fillet welds therebetween while overlapping the edges of each alloy sheet so that no substrate is exposed, (c) seal welding the entire periphery of the overlapping edges of the alloy sheets by supplying an alloy filler metal wire and the shielding gas of the present invention to an electric arc joining the alloy sheets to each other and not to the substrate.

In more detail, the preferred welding parameters to be used in steps (b) and (c) above when covering a 0.25 inch thick steel substrate with 0.062 inch thick sheets of UNS No. N06022 alloy include using synergic pulse spray transfer mode with an arc of about 18 to 20 volts, 70 to 110 amps, DCRP, 25 cu. ft./hr. shielding gas and 180–210 inches/min of 0.035 inch diameter C-22 filler wire.

One of the key features of this invention is the ability to weld with a wide variety of gas metal arc welding transfer modes using a single welding shielding gas. This fact has important economic advantage to the welding industry by reducing the number of specialty mixed shielding gases which must be held in a shop inventory.

It has been shown that either Mix A or Mix B can be used to gas metal arc weld nickel-based or cobalt-based alloys, for example C-22 alloy or ULTIMET alloy, using short circuit mode, spray transfer mode, pulse spray transfer mode or synergic pulse spray transfer mode. In each case, excellent arc stability, weldability, bead profile, bead appearance and welder operator appeal has been noted. This is a unique feature which is not attributed to other shielding gases in the prior art.

A second key feature of this invention is the careful control of an active (oxidizing) compound, carbon dioxide, so that preferred arc characteristics are maintained without producing excessive weld metal oxidation. Such control results in minimum interpass grinding and cleaning. Specifically, it was discovered that there is a range of carbon dioxide content which is sufficient to provide arc stability and arc control while not excessively oxidizing the weld metal. The range of carbon dioxide in this invention (0.1%-0.9% carbon dioxide) is noted to be significantly lower than the carbon dioxide ranges generally taught in the prior art.

A third key feature of this invention is the careful blending of the ingredients so as to provide a minimum cost of the mixed gas. It was discovered that there is need for a minimum of about 10% helium in this shielding gas. However, when helium content was significantly increased to levels above 10%, no improvement in welding characteristics was noted. It is therefore believed that there is an optimum range for helium where both cost and welding operability are achieved.

It will be apparent to those skilled in the art that the novel principles of the invention disclosed in connection with specific examples thereof will support various other modifications and applications of the same. For example, the novel shielding gas should be useful in processes other than arc welding in which a gas is used in conjunction with a hot or molten superalloy. It is accordingly desired that, in construing the breath of the appended claims, they shall not be limited to the specific examples of the invention described.

What is claimed is:

1. A shielding gas mixture suitable for use in arc welding and consisting essentially of, in percent by volume, about 5 to 13% helium, 0.1 to 0.9% carbon dioxide and the balance argon plus impurities.

2. The shielding gas of claim 1 containing 8 to 12% helium and 0.25 to 0.75 carbon dioxide.

3. The shielding gas of claim 1 containing about 10% helium and about 0.25 to 0.55% carbon dioxide.

4. An improved process for welding superalloys of the type in which a shielding gas surrounds an electric arc during welding, wherein the improvement comprises mixing carbon dioxide, helium and argon to provide a shielding gas consisting essentially of about 0.1 to 0.9% carbon dioxide and 5 to 13% helium with the balance argon plus usual impurities, then flowing said shielding gas to said arc during welding.

5. A process for forming a leak-tight, protective covering on a surface of structural steel substrate by welding thin sheets of corrosion-resistant, nickel-base alloy thereon, comprising the steps of:
   a) cleaning the steel substrate and the alloy sheets at least in the area to be welded,
   b) attaching the alloy sheets to the substrate while overlapping the edges of each alloy sheet so that no substrate surface is exposed, and
   c) seal welding the entire periphery of the overlapping edges of each alloy sheet while shielding the weld with a gas consisting essentially of, in percent by volume, about 5 to 13% helium, 0.1 to 0.9% carbon dioxide and the balance argon plus usual impurities.

6. The process of claim 5 wherein said thin alloy sheets contain about 20-22.5% Cr, 12.5-14.5% Mo, 2.5 to 3.5% W and 2-6% Fe in a nickel base and said shielding gas is about 8 to 12% helium and 0.25 to 0.75% carbon dioxide in an argon base.

* * * * *